United States Patent Office 3,399,156
Patented Aug. 27, 1968

3,399,156
POLYPROPYLENE HAVING CONTROLLED SLIP
Gordon W. Bell, Jr., Wilmington, Del., assignor to Avisun Corporation, Philadelphia, Pa., a corporation of Delaware
No Drawing. Filed Sept. 30, 1965, Ser. No. 491,890
2 Claims. (Cl. 260—29.1)

This invention relates to crystalline polypropylene compositions, and particularly films made therefrom having controlled coefficients of friction.

One of the major drawbacks of films formed from unmodified crystalline polypropylene is their film-to-film coefficient of friction which often makes it difficult to feed single sheets thereof to automatic packaging equipment and the like. Another disadvantage of such films is their tendency to block, which is defined as the tendency of two or more film surfaces to adhere to each other while under pressure. This blocking phenomenon manifests itself in packaging operations wherein a roll of film is used, making it difficult, if not impossible, to remove the film from the roll.

It has been found possible to reduce the coefficient of friction of polypropylene films to very low values by incorporating minor quantities of fatty acid amides into the polymer, as disclosed in U.S. Patent No. 3,176,021. Such films are quite satisfactory for use in operations such as overwrapping articles but are quite unsatisfactory in use on bread-wrapping machines. A film for use on these machines must have a slip of from about 0.45 to 0.6, as hereinafter defined, in order to run in a satisfactory manner. While slip values in this range can be obtained by adding minute amounts of the amide to the polymer, it is very difficult to regulate exactly the amount of amide added to the polymer, and it is also very difficult to disperse the additive evenly into the polymer in such small quantities, which can result in a film having uneven slip characteristics.

It is the object of this invention to provide polypropylene films adapted for bakery use which have a slip of from about 0.45 to about 0.6. I have found that this object may be attained by adding to the polypropylene from about 0.05% to 0.3% by weight of a silicon oil having a viscosity of from about 200 to about 10,000 centistokes, and from about 0.05% to about 0.3% by weight of a micron sized silica. This combination of ingredients is quite insensitive to variations in additive level, so that the necessity for precise concentration control is eliminated. Further, the slip of films containing these additives does not vary significantly with time, whereas the slip of films containings fatty acid amides will increase substantially with time, as the amide migrates to the surface of the film. It is necessary to add both the silicone oil and the silica to the polymer, since addition of either alone, while some improvement in slip is noted, will not increase the slip to the extent desired for bakery film.

The compositions of the invention may be prepared by any method suitable for insuring a uniform mixture of polypropylene and the additives in the final fabricated article. For example, the silica and the silicone oil may be added to the powdered polymer, followed by mechanical working in order to distribute the additives uniformly. The additives may also be incorporated into preformed polypropylene pellets by melt blending in conventional apparatus such as a Banbury mixer or a plasticator. A concentrate of the additives in polypropylene may also be made into pellets, and this concentrate may in turn be blended with additive-free polypropylene pellets, and the mixture of pellets may be fed directly to the extruder, or it may be homogenized in a Banbury.

Coefficients of friction or slip given in the following examples were determined by the Moving Sled-Stationary Film method subsequently described. The film was manufactured by casting onto a chill roll. Since the slip of the two surfaces of film manufactured by this method are not equal, two values are determined, one face-to-face contact and the other back-to-back contact.

Static slip given in the following tables is measured between two film surfaces. The equipment used for this purpose is a table model Instron tester equipped with a slip table which is secured to the cross head. The test sled used according to this method is a rectangular metal block, 4 inches by 2.5 inches wrapped with a 0.125 inch thick sponge rubber sheet. The block is equipped with a hook and film clamping means, and the sled has a total weight of 500 gr.±5 gr. The slip table has a pulley attached to it, and when the device is in use, a line secured at one end to the strain gauge of the Tester is run through the pulley and is attached to the hook on the sled. Thus, in operation, when the cross head and the slip table move downwardly, the sled is pulled from one end of the table to the other.

In order to conduct the tests, two pieces of film are cut for each run, one being 14 inches by 3.5 inches and the other being 9 inches by 2.5 inches. The larger piece of film is centered on the slip table with its test surface uppermost and with one end secured to the table with pressure sensitive tape. The smaller sample is wrapped around the sled with the test surface on the outside, and the sample is secured at the top of the sled. The cross head is then started at a rate of 10 inches a minute, and the slip value read from the strain gauge.

In accordance with this test method, the slip, i.e., the coefficient of friction, equals the force required to effect movement between the two film surfaces divided by the normal force brought to bear by the sled, or $$\text{Slip} = \frac{\text{Grams Force Required to Produce Motion}}{\text{Sled Weight Grams}}$$

In order that those skilled in the art may more fully understand the nature of my invention and the method of carrying it out, the following examples are given.

Examples 1 through 3

In these examples polypropylene films were prepared containing 0.1% by weight of a colloidal silica having an average particle size of 3.3 microns available commercially under the trademark of Syloid 244, and 0.1% by weight of dimethyl silicone oil. In Example 1, the viscosity of the oil was 350 centipoises; in Example 2, 1,000 centipoises; and in Example 3, 10,000 centipoises, the viscosity being measured at 77° F. (25° C.). The Control 1 film contained 0.1% silica, but no silicone oil, while the Control 2 film contained 0.1% silicone oil of 350 centistokes viscosity, but no silica. Results of the tests are set forth in the following table.

TABLE I.—SLIP

|  | Initial |  | After 1 week |  | After 1 month |  |
|---|---|---|---|---|---|---|
| Control 1 | .74 | .80 | .75 | .76 | .77 | .72 |
| Example 1 | .54 | .53 | .52 | .55 | .48 | .58 |
| Example 2 | .77 | .72 | .58 | .61 | .62 | .54 |
| Example 3 | .73 | .73 | .66 | .62 | .59 | .59 |
| Control 2 |  |  | .748 |  |  |  |

Examples 4 through 9

In these examples polypropylene films containing varying amounts of the same silica and silicone oil of 350 centistokes viscosity were tested. Results of testing are given in the following table.

TABLE II

| Example | Wt. percent | |
| --- | --- | --- |
| | Silica | Oil |
| 4 | 0.1 | 0.133 |
| 5 | 0.1 | 0.1 |
| 6 | 0.1 | 0.15 |
| 7 | 0.1 | 0.2 |
| 8 | 0.2 | 0.1 |
| 9 | 0.2 | 0.2 |

| Example | Slip | | | |
| --- | --- | --- | --- | --- |
| | Initial | After 72 hrs. | After 96 hrs. | After 1 week |
| 4 | .95 | .68 | .58 | .59 .58 .51 |
| 5 | .59 | .87 | .54 | .52 |
| 6 | .80 | .85 | .51 | .58 |
| 7 | .85 | .71 | .50 | .48 |
| 8 | .85 | .93 | .61 | .55 |
| 9 | .87 | .85 | .63 | .61 |

As may be seen from the foregoing, the amount of each of the additives may be varied over a fairly wide range, but the slip remains essentially the same.

One other example and two other controls were run to test the effect of silica alone and silicone oil (350 cs.) alone at the same weight level as the combined ingredients. In this case slip was tested 5 hours after the manufacture of the film. Results are given in the following table.

TABLE III

| | Weight percent silica | Weight percent oil | Slip |
| --- | --- | --- | --- |
| Example 10 | 0.1 | 0.133 | .65 |
| Control 3 | 0.233 | | .78 |
| Control 4 | | 0.233 | .88 |

As may be observed, the combination of the silica and the oil gave a film of greatly improved slip as compared to the films containing the silica or the oil alone.

It will be realized that other additives, such as stabilizers and pigments, may also be present in the film. In the films of the controls and examples, the polypropylene used in their manufacture contained 0.1% by weight of 3,5-ditertiarybutyl-4-methylphenol as a heat stabilizer.

The invention claimed is:

1. A composition of matter consisting essentially of substantially crystalline polypropylene, and from about 0.05% to about 0.3% of a dimethyl silicone oil having a viscosity of from about 200 to about 10,000 centistokes, and from about 0.05% to about 0.3% of a silica having an average particle size of about 3.3 microns.

2. The composition of claim 1 wherein the silicone oil has a viscosity of about 350 centistokes.

References Cited

UNITED STATES PATENTS

| 2,991,264 | 7/1961 | Monroe | 260—29.1 |
| 2,992,201 | 7/1961 | Gober | 260—29.1 |
| 3,176,021 | 3/1965 | Volungis. | |

JULIUS FROME, *Primary Examiner.*